United States Patent [19]
Takayasu

[11] 3,922,768
[45] Dec. 2, 1975

[54] METHOD OF MANUFACTURING A HEAT EXCHANGER

[76] Inventor: Kiyotelu Takayasu, C8-108, Nakatomigaokadanchi, 4162-1, 1-chome, Nakatomigaoka, Nara, Japan

[22] Filed: June 26, 1974

[21] Appl. No.: 483,299

[30] Foreign Application Priority Data

| | | |
|---|---|---|
| June 26, 1973 | Japan | 48-72498 |
| Dec. 10, 1973 | Japan | 48-137990 |
| Dec. 10, 1973 | Japan | 48-137992 |
| Dec. 10, 1973 | Japan | 48-137993 |
| Dec. 10, 1973 | Japan | 48-137994 |
| Aug. 16, 1973 | Japan | 48-91854 |
| Oct. 1, 1973 | Japan | 48-110828 |

[52] U.S. Cl.............. 29/157.3 R; 29/157.4; 29/515; 29/516; 113/118 R
[51] Int. Cl.².................... B21D 53/02; B23P 15/26
[58] Field of Search............ 29/157.4, 157.3 R, 516, 29/520, 515; 122/512; 113/118 R; 165/173

[56] References Cited
UNITED STATES PATENTS

| | | | |
|---|---|---|---|
| 407,982 | 7/1889 | Wilmot | 29/515 |
| 513,620 | 1/1894 | Phillips | 122/512 |
| 2,944,326 | 7/1960 | Stadthaus et al. | 29/520 X |
| 3,068,160 | 12/1962 | Erwin | 29/520 UX |
| 3,279,532 | 10/1966 | Pfeil | 165/173 X |
| 3,710,858 | 1/1973 | Young | 113/118 R X |
| 3,787,945 | 1/1974 | Pasek et al. | 29/157.4 |

*Primary Examiner*—Lowell A. Larson
*Assistant Examiner*—D. C. Reiley, III
*Attorney, Agent, or Firm*—Oblon, Fisher, Spivak, McClelland & Maier

[57] ABSTRACT

A heat exchanger of the type characterized by a plurality of pipes serving as the heat exchange component and connected at their opposite ends to a pair of end plates is formed without welding or brazing by inserting the tip portions of each of the pipes into holes bored into the end plates and then pressing inwardly on the peripheries of the end plates to plastically deform the end plates and thereby secure the pipes therein in tightly sealed relation with the holes bored in the end plates.

8 Claims, 10 Drawing Figures

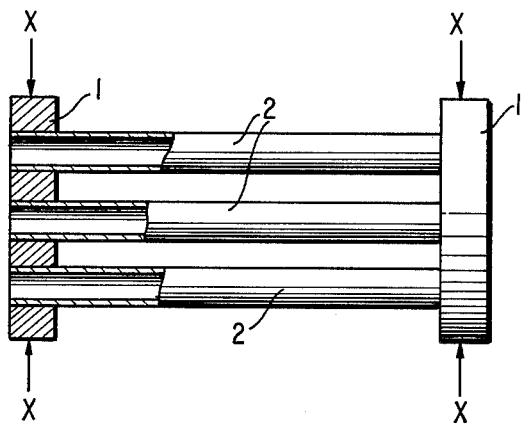
FIG. 1
FIG. 2
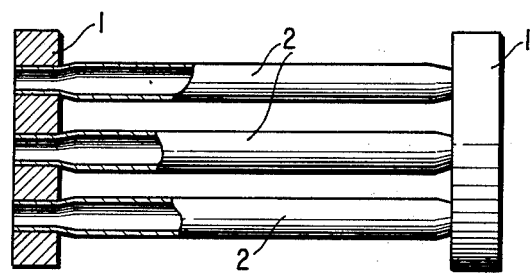
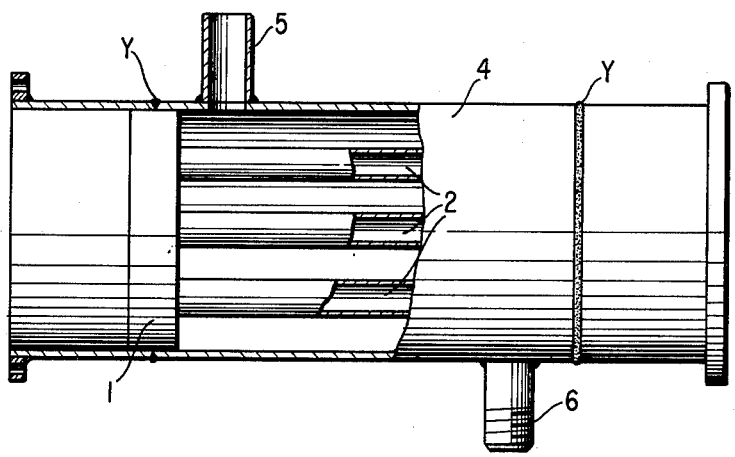
FIG. 3

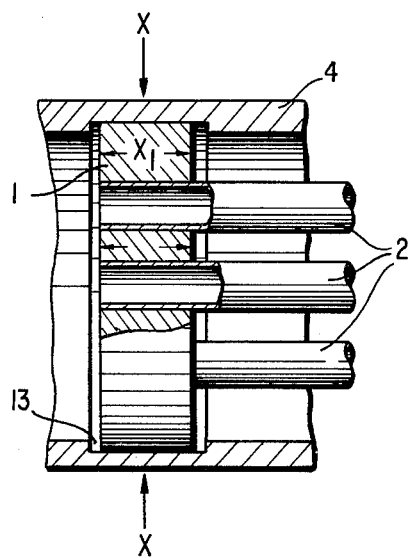
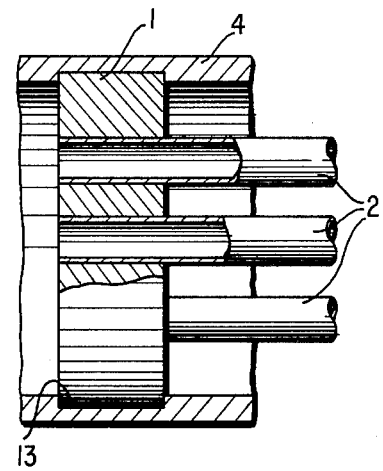
FIG. 7        FIG. 8
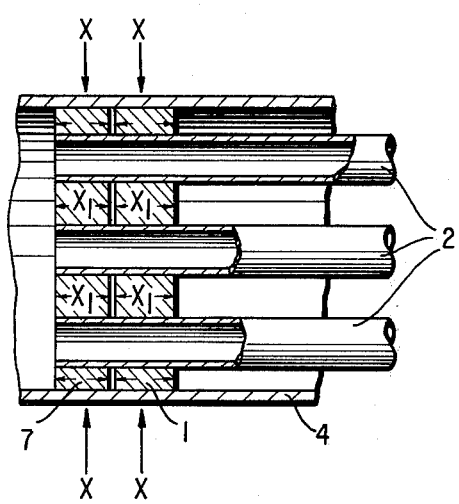
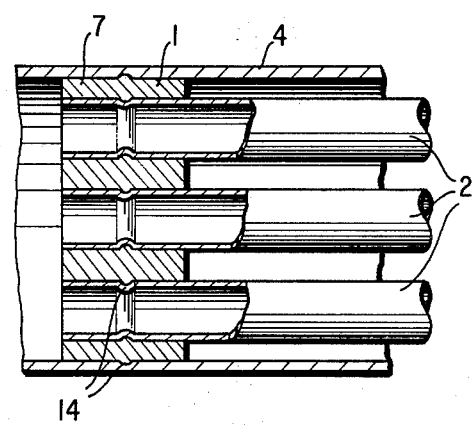
FIG. 9        FIG. 10

METHOD OF MANUFACTURING A HEAT EXCHANGER

BACKGROUND OF THE INVENTION

1. Field of the Invention

The present invention relates generally to a method for manufacturing a heat exchanger and to the heat exchanger manufactured by such method, and especially to the type of heat exchanger having a plurality of pipes and a pair of opposing end plates to which the opposing ends of the pipes are connected as the components thereof for carrying out the heat exchange therein.

2. Description of the Prior Art

The type of heat exchanger characterized by a plurality of pipes connected at opposing ends to a paair of end plates and in which heat is mainly exchanged through the pipes is very popular for use in electric air conditioners, gas boilers and in many other common heat exchanging apparatus. For manufacturing such heat exchangers with the characteristic pipes and end plates, it is necessary to construct them so as to form separate paths for the fluids between which heat is to be exchanged and to completely seal the paths.

On the other hand, it is also known, after each tip of the pipes is inserted into the holes, to forcedly expand the tips outwardly. The expansion of the tip in this case makes the welding or brazing operation more easy, but it is not enough by itself to provide the necessary sealing for the heat exchanger, and essentially additional work in the form of welding or brazing is still required.

Therefore, the type of heat exchanger having a plurality of pipes connected to end plates is lacking in dimensional accuracy, since it must be exposed to high temperature during the welding thereof, and productivity suffers because of the troublesome and difficult work heretofore required in the manufacture thereof.

SUMMARY OF THE INVENTION

Accordingly, it is an object of the present invention to simplify the manufacturing of the type of heat exchangers having a plurality of pipes connected at their opposing ends to end plates by eliminating the usual trouble and difficulty encountered in the welding or brazing thereof.

Another object of the present invention is to provide a compact heat exchanger of the type having a plurality of pipes whose opposing ends are connected to end plates having improved dimensional accuracy and which is completely sealed.

Another object of the invention is to increase the effective surfaces for heat exchanging per unit. in such heat exchangers as characterized herein.

The foregoing and other objects as well are achieved by the present invention which is characterized in a method for manufacturing such heat exchangers having pipes as the heat exchanging components wherein each tip portion of the pipes is inserted into holes bored in an end plate and the end plate is then subjected to plastic deformation which is caused to occur by pressing on the periphery of the end plate, and a heat exchanger formed thereby which has an end plate subjected to plastic deformation by pressing on the periphery thereof and pipes so deformed within holes having first been bored in the end plate that the diameter at the tip portion inserted into the holes is then smaller than that at the other portion of the pipes not subjected to such pressing.

According to the invention, a heat exchanger which is compact and affords complete sealing is obtained without the troublesome and laboring work of welding or brazing heretofore required in such manufacture. Further, the heat exchanger obtained permits the effective heat exchange between fluids passing therethrough because it has more surface for heat exchanging per unit volume compared with heat exchangers manufactured by the conventional methods on which the total number and space of the pipes arranged in an end plate are limited for fear that the end plate or the pipes might be spoiled in the course of the welding or brazing thereof. Namely, it is possible in the heat exchanger designed according to the present invention to increase the ratio of total space of the holes to the rest of the space remaining in the end plate and accordingly to increase the total area of the surfaces for exchanging of heat of the pipes since useless space for welding or brazing is now not required in the end plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference numerals designate like or corresponding parts throughout the several views, and wherein:

FIGS. 1 and 2 are schematic views of a heat exchanging component constructed of a plurality of pipes connected at opposing ends thereof to a pair of end plates and which show the characteristic steps of the method of this invention;

FIGS. 3 and 4 are partially sectional views of two embodiments of the heat exchangers constructed according to the present invention;

FIGS. 7 – 10 are schematic views of other embodiments of heat exchangers and showing preferable steps therefor which are based on the theory of this invention.

DETAILED DESCRIPTION OF THE PREFERRED EMBODIMENTS

Figure 4:
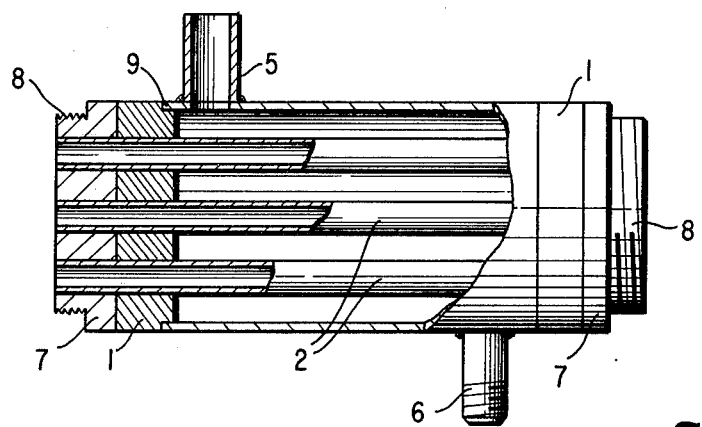

Referring now to the drawings, and more particularly to FIGS. 1 and 2 thereof, a plurality of elongate pipes 2 through which heat is mainly exchanged are shown being arranged in parallel relation with each other. The end tips of the pipes 2 are inserted into respective holes bored in each of a pair of opposed end plates 1 which are then subjected to plastic deformation by being pressed on their peripheries. While pressing on the peripheries of the end plates 1, the force for the plastic deformation is directed from the outside and radially to the center of the end plates 1 and may be generated by any well known apparatus, such as, for example, a rotary swaging machine, a hydraulic hammer and the like, which is capable of pressing constantly on the peripheries of the end plates 1 and of applying intermittent force to the same. The reference character X symbolizes the forces being applied for the plastic deformation. The holes bored in the end plates 1 thereby decrease in diameter together with advancement of the plastic deformation. Accordingly, the tips inserted in the holes are so deformed that the diameter of the tips is smaller than that of the other portions of the pipes 2 and that the peripheral surfaces of the tips are forcedly contacted with the inner surfaces of the holes.

FIG. 2 shows a heat exchanging component after the end plates have been subjected to such plastic deformation. The heat exchanging component thus formed permits fluid paths to be formed which are defined by the pipes 2 and the end plates 1, with sealing up the clearances having previously existed between the peripheral surfaces of the tips and the inner surfaces of the holes being achieved without welding or brazing.

In the embodiment shown in FIG. 3, the heat exchanging component is placed within a cylindrical body 4 which has nozzles 5 and 6 welded on the surrounding surface. The cylindrical body 4 is also welded with the peripheries of the end plates 1 by heating, such as by arc welding or resistance welding in inert gases, electron beam welding or laser beam welding. The reference character Y in this case symbolizes the welded portions of the cylindrical body 4.

The welding causes the formation of two fluid paths which are respectively divided. One of the fluid paths is formed by the insides of the pipes 2 and the spaces defined by the end plates 1 inside the cylindrical body 4, but longitudinally disposed from where the pipes 2 are placed, that is, outside the boundary defined by the end plates. Another of the fluid paths is formed by the spaces inside the cylindrical body but outside the pipes 2 and inside the nozzle 5 and 6. Fluids with different temperatures flow independently in each fluid path and heat is exchanged mainly through the pipes 2.

In FIG. 4, another heat exchanger is shown, in the manufacture of which, the steps described in FIGS. 1 and 2, or embodying the present invention, are utilized. Besides the end plates 1, in this case, auxiliary end plates 7 are provided just outside the end plates 1 and the pipes 2 are inserted into aligned holes bored in both the end plates 1 and the auxiliary end plates 7. The force for the plastic deformation is also applied to the peripheries of both end plates 1 and the auxiliary end plates 7. After the plastic deformation occurs, the heat exchanging component is subjected to machine-work and is so formed to have a screw head 8 and notch portions 9. A cylindrical body 4 having nozzles 5 and 6 is attached to the end plates 1 so as to fit its terminals with the notch portions 9. As described hereinafter, successful sealing between the pipes 2 and the end plates 1 and 7 is obtained because a plurality of the end plates 1 and 7 for a group of tips generate concentrated forces which are able to press discontinuously specified parts in the tip portions.

Figure 5:
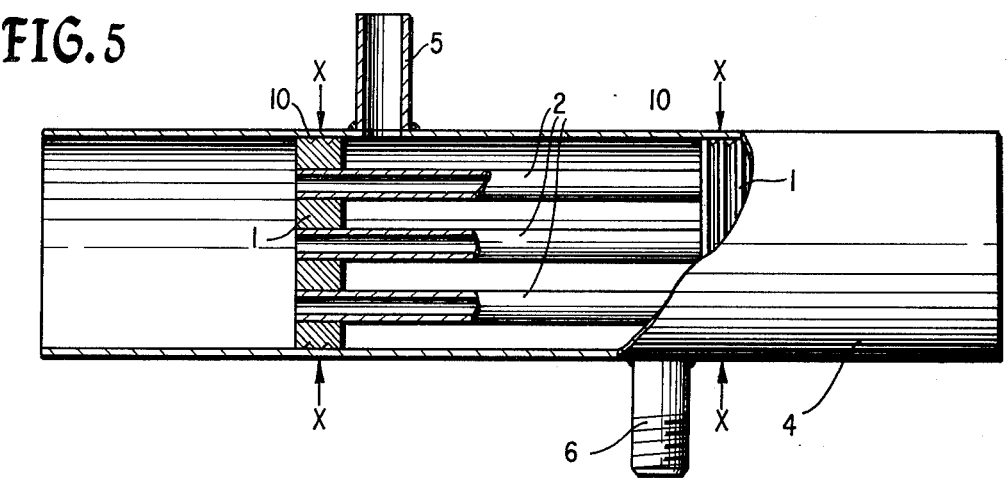
FIG. 5 is a partially sectional view of another embodiment of a heat exchanger formed according to this invention and shows a structural arrangement thereof before the end plates are subjected to plastic deformation.
Figure 6:
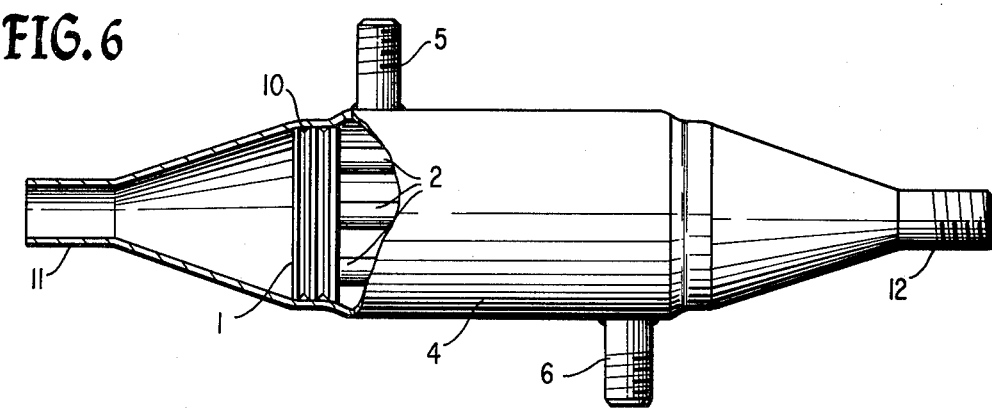
FIG. 6 is a partially broken away side view of the embodiment shown in FIG. 5, illustrating the end plates after plastic deformation.

FIGS. 5 and 6 show yet another heat exchanger in the manufacture of which the steps described in the explanation of FIGS. 1 and 2 are still utilized. Before the end plates 1 are subjected to plastic deformation, notches 10 are formed on the peripheries of the end plates 1, and the end plates 1 and pipes 2, the tips of which are inserted into the holes bored in the end plates 1, are placed within a cylindrical body 4 having nozzles 5 and 6.

After the end plates 1 and pipes 2 are suitably settled in the cylindrical body 4, the force for plastic deformation, which presses on the outer surface of the cylindrical body 4, is applied to the end plates 1 through the corresponding portions of the cylindrical body 4. The force effects the deformation of both the corresponding portions of the cylindrical body 4 and the end plates 1 as shown in FIG. 6. The clearance having been left between the end plates 1 and the cylindrical body 4 by the notches 10 decreases and is sealed up with firm contact being made between the notches 10 and the inside of the body 4, while the end plates 1 are deformed to grasp the tips of the pipes 2 by the application of the force. Further, more effective sealing is possible by placing sealing materials, like rubber, between the peripheries of the end plates 1 and the inner surface of the cylindrical body 4. The terminals of the cylindrical body 4 form nozzles 11 and 12.

FIGS. 7 – 10 show yet other embodiments which utilize the conception of applying force through the cylindrical body 4.

Referring to the embodiment shown in FIGS. 7 and 8, grooves 13 are provided on the inner surface of the cylindrical body 4. When the force for plastic deformation is applied from outside the cylindrical body 4, the end plates 1 are deformed to be decreased in diameter and to be increased in thickness. The deformations in the direction of thickness are symbolized by $X_1$ in FIGS. 7 and 8 and act to expand the thickness corresponding to the pressing force X. As a result of the expansion, the peripheries of the end plates 1 are fixed within the grooves 13. FIG. 8 shows the end plates 1 deformed in the cylindrical body 4 and fixed by the grooves 13.

Referring to the embodiment shown in FIGS. 9 and 10, two end plates 1 and 7 face one another and are disposed so as to grasp the tip portions of the pipes 2. The forces applied to the respective peripheries of the two end plates 1 and 7 effect the occurrence of the expansions in direction of thickness and of compression between the two end plates 1 and 7, which is also shown by $X_1$. The compression permits of pressing discontinuously the specified parts 14 into the tip portions and makes sealing of the fluid paths extremely firm.

EXAMPLE

A heat exchanger is made of:

stainless pipes being 5.5 mm in diameter and 0.3 mm in thickness;

stainless end plates being 20 mm in diameter and 15 mm in thickness; and a stainless hollow cylindrical body being 21 mm in diameter and 0.5 mm in thickness.

Wherein, the end plates were subjected to plastic deformation according to the steps described in the embodiment of FIGS. 5 and 6, and a rotary swaging machine was used for plastic deformation and the end plates were deformed under a pressure of 4,000 – 6,000 kg/cm².

In the pressure test, the above heat exchanger made proof of feasibility, when it kept pressure being of 20 kg/cm², without any leakage.

As mentioned above, such a heat exchanger that has a plurality of pipes and end plates may be manufactured successfully, easily and accurately, according to the present invention. Further, the heat exchanger manufactured upon the characteristic steps of the invention is compact and accurate enough to increase the heat exchanging efficiency because it is free from the troublesome problems in conventional heat exchangers in the manufacturing of which end plates and pipes are connected by welding or brazing.

Obviously, many modifications and variations are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing heat exchangers having a plurality of pipes as the heat exchanging component and opposing end plates to which the pipes are connected, comprising the steps of:
   inserting each tip portion of each of said pipes into holes bored in said end plates; and
   subjecting the end plates to plastic deformation by pressing inwardly and uniformly on the peripheries of the end plates so that the pipes are thereby secured therein in tightly sealed relationship without welding or brazing.

2. The method as set forth in claim 1, wherein the pipes and end plates are disposed within a cylindrical body before said end plates are subjected to said plastic deformation, and said force for said plastic deformation is applied to said end plates and said pipes through the cylindrical body.

3. The method as set forth in claim 1, wherein each tip portion of each of said pipes is inserted into holes bored in a plurality of end plates disposed adjacent one other, and said forces for said plastic deformation are respectively applied to the peripheries of said plurality of end plates disposed adjacent to each other.

4. The method as set forth in claim 2, further comprising forming a notch on the peripheries of said end plates before said end plates are disposed in the cylindrical body.

5. The method as set forth in claim 2, further comprising forming a groove on the inner surface of said cylindrical body before said end plates are disposed in the cylindrical body.

6. The method as set forth in claim 1, further comprising machining the end plates after subjecting said end plates to said plastic deformation.

7. The method as set forth in claim 2, further comprising placing a sealing material between the peripheries of said end plates and the inner surface of said cylindrical body before subjecting said end plates to plastic deformation.

8. The method as set forth in claim 1, further comprising positioning said plastically deformed end plates and pipes in a cylindrical body and welding the cylindrical body to the peripheries of the end plates therein.

* * * * *